HIGH PERMEABILITY MAGNETIC HEAD ASSEMBLY

Filed Dec. 16, 1963 2 Sheets-Sheet 1

BEVERLEY R. GOOCH
INVENTOR.

BY Stuart Lubitz
ATTORNEY

BEVERLEY R. GOOCH
INVENTOR.

BY Stuart Lubitz
ATTORNEY

United States Patent Office 3,365,709

Patented Jan. 23, 1968

3,365,709

HIGH PERMEABILITY MAGNETIC HEAD ASSEMBLY

Beverly R. Gooch, Sunnyvale, Calif., assignor to Ampex Corporation, Redwood City, Calif., a corporation of California Filed Dec. 16, 1963, Ser. No. 330,743
8 Claims. (Cl. 340—174.1)

ABSTRACT OF THE DISCLOSURE

A magnetic record/reproduce head assembly comprising a stack of laminations of hard material having a high permeability and a sandwich material located about said stack and having a higher permeability than the stack material, the stack of laminations being positioned to preferably form a transducing gap.

This invention relates to a magnetic head assembly. More particularly, this invention relates to a head assembly for a magnetic disc tape recorder wherein the core structure of the head assembly is made from laminations of at least two different materials and the gap of the core structure is precisely aligned with a diameter or center line of the disc of the disc recorder.

The invented magnetic head assembly is intended to be used for both the recording and reproducing process of a magnetic recorder. In order to function effectively during both of these processes, the core structure of the head must be susceptible to repeatable manufacture having accurately controlled parameters such as permeability. The accurate control of the parameters is necessary since the core must be matched and compatible with both the read and write electronics. Head cores made solely from such materials as an Al-Fe alloy (hereinafter referred to as alfenol) have a permeability which will greatly vary from batch to batch. This variance is attributable to the manner of the heat treating the alfenol incident to the manufacture of cores with the desired hardness and other characteristics. The variation in permeability of the alfenol when place in a core made solely from alfenol is accentuated by the fact that the alfenol is a substantial factor in determining the reluctance of the core.

In order to overcome these shortcomings, a magnetic head assembly has been invented that utilizes a core comprising a stack of alfenol laminations or other similar materials including a gap therein and a sandwich or plurality of Mumetal laminations or other similar materials placed about or in functional contact with both sides of the stack of alfenol laminations. The combination of materials and their arrangement provides a core that has a relatively high permeability. This permeability does not contribute substantially to the reluctance of the head core and any variation in the permeability of the composite core is masked or swamped by the reluctances of the transducing gap. In addition, the variation in permeability of the composite core of the head is not as great as a head core made solely from alfenol.

The above described head core construction is especially well suited for a magnetic head assembly in which the tip of the core firmly contacts the magnetic recording medium. This is so because the alfenol laminations which contact the recording disc are very hard and are well suited to resist wear.

Another aspect of the disclosed invention is the cooperation between the head assembly and the center line, diameter or radius of the recording disc. It has been found that in this type of recorder it is necessary that the gap be accurately aligned with the center line or radius of the disc. This alignment is accomplished by having the gap surface of the core aligned with a reference surface in the head core carrier. The reference surface of the carrier is in turn mounted on a reference surface of a mounting means which moves along the arm of the disc recorder that is precisely situated with regards to the center line of the disc recorder.

Another significant aspect of the invention head assembly is the manner in which the tip or the gap of a core contacts the disc. The tip of the head projects through a shield to contact a relatively small area of the disc recording medium. This small contact area enables a large contact pressure to be exerted on the disc. The large contact pressure minimizes drop-outs and improves performance. The placement of the shield away from the proximity of the disc minimizes the collection of dust and dirt particles and also minimizes the size of tip contact area. A rubber backing member to the disc facilitates the cooperation between the tip of the magnetic head and the disc.

It is an object of this invention to provide an improved magnetic head assembly;

Another object of this invention is to provide a magnetic head assembly with magnetic characteristics that can be repeatedly manufactured;

Another object of this invention is to provide a core for a magnetic head assembly that has a minimum variation of reluctance;

Another object of this invention is to provide a magnetic head assembly having a core with a relatively constant reluctance and durable tips;

Another object of this invention is to provide a magnetic head assembly that can be readily aligned with the center line of a disc;

Another object of this invention is to provide a magnetic head assembly with a configuration that minimizes drop-outs and dirt collection.

These and other objects and advantages will be more fully appreciated when the detailed written description is read in conjunction with the drawings wherein.

Figure 1:
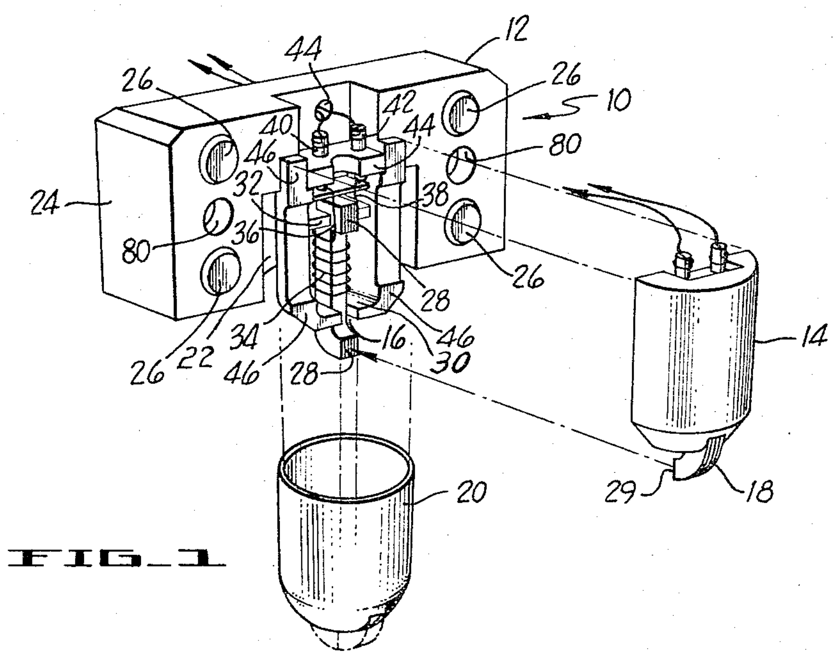
FIGURE 1 is an exploded view of the magnetic head assembly.

Referring to FIGURE 1, the magnetic head assembly 10 includes a magnetic head carrier 12, a half cylindrical member 14, a pair of core halves 16 and 18 and a shield or shield can 20. The magnetic head core carrier 12 includes a half cylindrical member 22 that is adapted to receive one of the core halves 16. The half cylindrical member 22 is intergral with a mounting portion 24 of the core carrier 12. The mounting portion 24 includes a plurality of reference surfaces 26 that are precisely referenced or located with regards to the gap surfaces 28 of the core half 16. The core half 16 is positioned in the cylindrical member 22 in a pair of recesses 30 and 32 both of which are located in the cylindrical member 22. The core 16 has a coil 34 wound about it and having leads 36 and 38 that pass through a pair of hollow terminals 40 and 42 positioned in a terminal board 44 that is secured to the core carrier 12. The leads 36 and 38 are secured to terminals 40 and 42 by an appropriate method such as soldering.

The gap surfaces 28, in addition to being precisely located relative to the surfaces 26, are precisely located with regards to a plurality of surfaces 46 that contact similar surfaces on the cylindrical member 14. The cylindrical member 14 and its associated core half 18 is constructed in the same manner as the cylindrical half 22 and the core half 16. The gap surfaces 28 of the disclosed embodiment of the invention may be vacuum deposited in accordance with well known techniques to form a transducing gap or they may incorporate shims to firm the transducing gap.

Once the cylindrical halves 14 and 22 are assembled with their associated core halves 16 and 18 aligned, they are secured together by injecting a setting or potting compound into the interior of the aligned cylindrical members 14 and 22. With the cylindrical members 14 and 22 fastened together, the shield 20 is placed over the cylindrical members 14 and 22 so that the gap or tip 29 of the core 16, 18 substantially projects from the shield.

Figure 2:
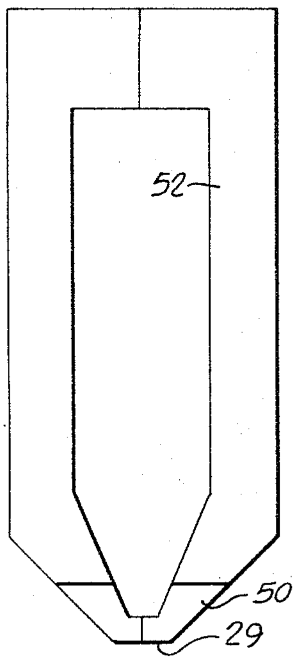
FIGURE 2 is a front view of the core structure.
Figure 3:
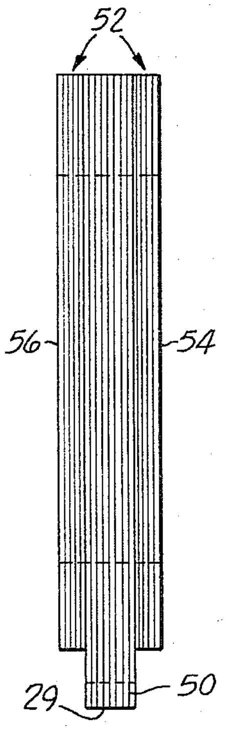
FIGURE 3 is a side view of the core structures of FIGURE 2.

The core 16, 18 of the magnetic head assembly 10, drawn clearly in FIGURES 2 and 3, is constructed from a stack of laminations 50 and a sandwich of laminations 52 made of a different and higher permeable material then the stack of laminations. Typically, the stack of laminations 50 may be constructed from an Al-Fe alloy which is very hard and resistant to wear such as the one commonly known as alfenol. The sandwich of laminations 52 may be constructed from a material that is commonly known as permalloy (Ni-Fe alloy). The sandwich of laminations 52 comprises a first plurality of laminations 54 and a second plurality of laminations 56 in contact with the stack of laminations 50 or operatively coupled thereto. It is of course within the scope of the invention to utilize only one portion of the sandwich of laminations such as the laminations 54 or to arrange the laminations in other manners consistent with the essence of the invention. The arrangement of the sandwich of laminations 52 and the stack of laminations 50 result in what might be termed a composite core structure. The composite core structure has a tip or gap portion 29. The sandwich of laminations 52 is spaced as close as possible to this gap portion 58 consistent with permitting the tips to be worn to a minimum gap depth.

Figure 4:
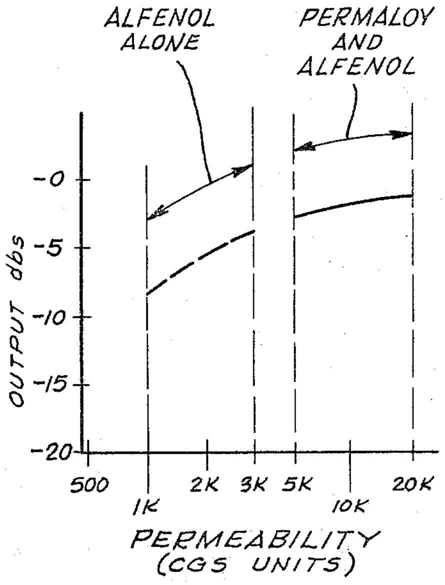
FIGURE 4 is a graphical comparison of a significant characteristic of the invented head core with a prior art head core.

In the above description of the core 16, 18 it should be noted that the tip 29 which cooperates with the magnetic medium is made from a relatively hard material such as alfenol. Such a material is adapted to resist wear. This tip material also forms an integral part of the core structure. The core structure is magnetically dominated, however, by the higher permeable material that makes up the sandwich of laminations 52. When a core structure is made of alfenol alone its permeability will vary considerably from batch to batch. This variance in the permeability of an all alfenol core structure is graphically portrayed in FIGURE 4 where the broken line shows a typical range of variance of the permeability of an all alfenol core as plotted against output variation. The solid line in the graph of FIGURE 4 shows the variation in the permeability of the invented core structure when its laminations are made from permalloy (or Mumetal) and alfenol. From this graphical comparison it can be seen that the invented core structure has a permeability variance which does not substantially effect the operation of the transducer. Although the permeability of this core structure varies to some extent its variance has such a high permeability that it does not substantially effect the transducer output.

Figure 5:
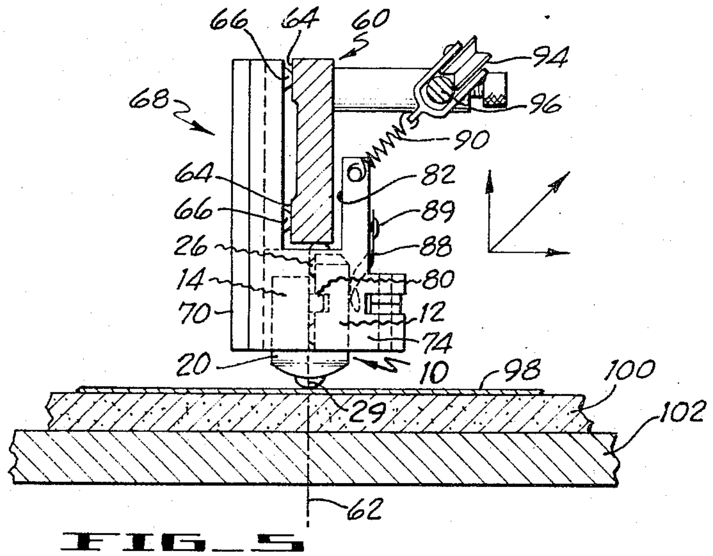
FIGURE 5 is an end view of the magnetic head assembly as mounted on the arm of the disc recorder.
Figure 6:
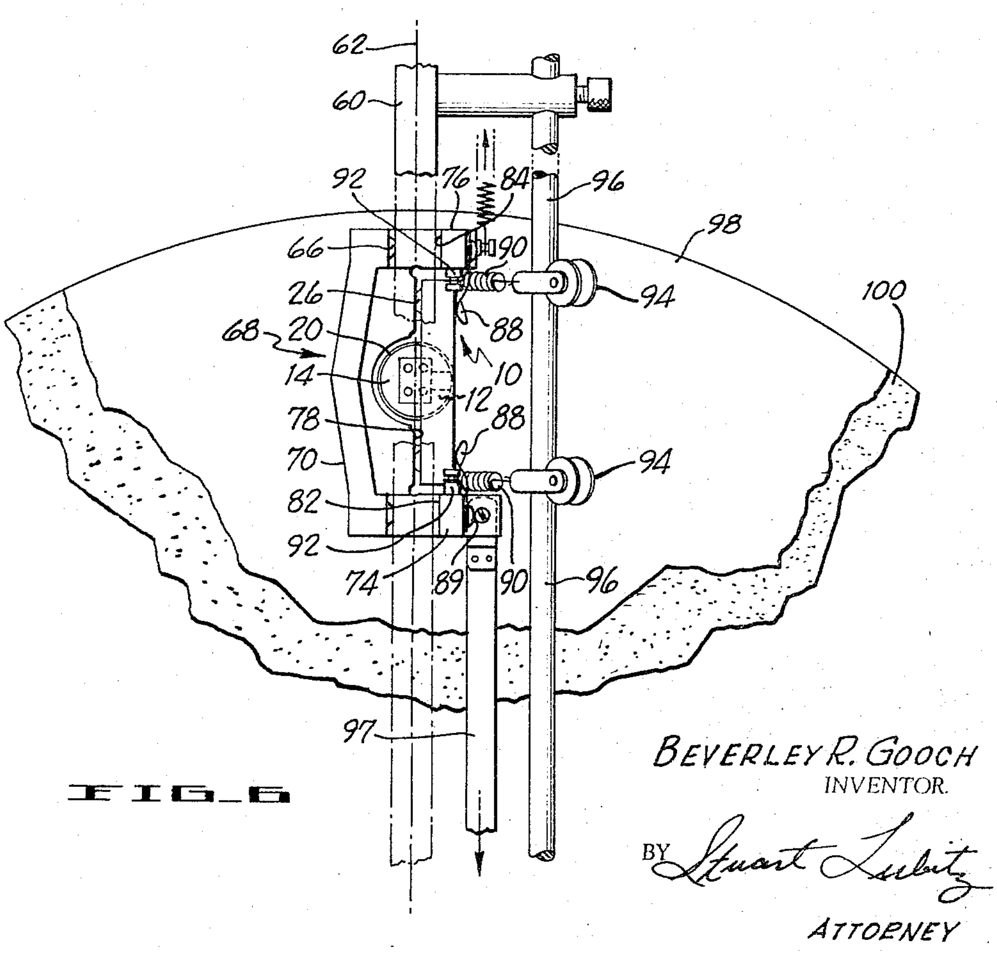
FIGURE 6 is a top view of the magnetic head assembly mounted on the arm of a disc recorder.

The magnetic head assembly 10 is shown as mounted in a disc recorder in FIGURES 5 and 6. The disc recorder has an arm structure or means 60 that is precisely aligned with the center line of the disc 62. A plurality of reference surfaces 64 are located on the arm 60 and cooperate with a plurality of reference surfaces 66 located on a means for attaching the magnetic head assembly to the arm 68. This means for attaching 68 comprises a mounting means 70 having a pair of arms 74 and 76. A surface 78 that lies between the arm 74 and 76 is located precisely on the center line of the disc recorder. This surface 78 has a plurality of pins or aligning means (not shown) which cooperate with the slots or apertures 80 (FIGURE 1) in the mounting portion 24 of the magnetic head assembly. This pin aperture arrangement functions to partially support the magnetic head assembly 10. The surface 78 also cooperates with the reference surfaces 26 on the magnetic head assembly which are precisely located with respect to the gap 28 so that the gap 28 is located on the center line of the disc recorder.

The arms 74 and 76 include recesses 82 and 84 which facilitate the movement of the means for attaching 68 relative to the arm 60. The means for attaching 68 also includes a pair of spring clips or other such holding means 88 which acts in cooperation with the pin-aperture arrangement 80 to secure the magnetic head asssembly 10 to the means for attaching 68. These spring clips 88 may be attached to the mounting means 70 by a screw, or other fastening means 87.

The mounting means 70 is held in contact with the arm 60 by a pair of springs 90 that are part of the attaching means 68. The springs 90 are secured to pins 92 on the mounting means 70 and secured to a pair of rollers or pulley members 94 that are adapted to roll along a portion of the arm 60 formed by a rail member 96. The means for attaching 68 is actuated to move along the arm 60 by a steel tape member 97.

The magnetic head assembly 10 and the associated means for attaching 68 moves over a magnetic disc recording medium 98 which is positioned on a resilient supporting member 100 and a more rigid supporting member 102. The resilient supporting member 100 enables the tip 29 to make a firm pressure contact with the magnetic recording medium 98. This contact is clearly shown in FIGURE 5. It should be noted that only a tip 29 is in contact with the magnetic recording medium 98 and the shield 20 is substantially removed from the surface of the recording medium. This prevents the collection of dust and dirt particles in the vicinity of the gap 28. The secure pressure contact of the tip 29 with the recording medium 98 also minimizes any dropouts.

From the above detailed written description it can be seen that a magnetic head assembly has been provided which may be precisely aligned with the center line or radius of a magnetic record disc, and that makes a secure pressure contact with the record disc. In addition the core structure of the magnetic head assembly is readily adapted to be used for both the record and the readout functions of the recorder. This advantage is attributable to the fact that the core structure may be repeatedly manufactured with an insignificant variation in the permeability.

While the above detailed description has shown, described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a magnetic head assembly a composite core comprising:
   a stack of parallel spaced laminations of hard material having a high permeability and including a transducing gap; and
   a sandwich of material located about said stack of parallel spaced laminations including a plurality of laminations of material having a higher permeability than the material of said stack of laminations.

2. The structure defined by claim 1 wherein said stack of laminations is made from an Al-Fe alloy.

3. In a magnetic head assembly, a composite core comprising:

a stack of parallel spaced laminations of hard material having a high permeability and forming a substantially closed path including a tip that forms a transducing gap; and a sandwich of material located about said closed path of hard material and including a plurality of parallel spaced laminations having a higher permeability than said closed path material laminations, said sandwich of material removed from said tip.

4. The structure defined by claim 3 wherein said hard material is alfenol and said sandwich material is Mumetal.

5. In a magnetic head assembly a composite core comprising:

a stack of parallel spaced laminations of hard material having a high permeability and including a transducing gap; and a sandwich of material located about said stack of parallel spaced laminations including a plurality of laminations of material having a higher permeability than the material of said stack of laminations, said sandwich of material removed from said gap.

6. In a magnetic disc recorder having a magnetic disc recording medium therein, the combination comprising:

an arm precisely positioned with respect to a center line of said disc;

a magnetic head assembly means including a core comprising a stack of parallel spaced laminations of hard material having a high permeability and including a transducing gap, and a sandwich of material including a plurality of parallel spaced laminations of material having a higher permeability than the material of said stack of laminations;

a reference surface on said magnetic head assembly means that is precisely located relative to said gap so that when said magnetic head assembly means is attached to said arm said gap will be precisely aligned with the center line of said disc; and means for attaching the magnetic head assembly means to said arm.

7. In a magnetic disc recorder having a magnetic disc recording medium therein, the combination comprising:

an arm including a reference surface precisely positioned with respect to a center line of the disc;

a magnetic head assembly means including a transducing gap and a reference surface, said head assembly including a core having parallel spaced laminations of a hard material and high permeability forming said gap and having parallel spaced laminations of a material with a substantially higher permeability than said hard material;

said transducing gap precisely located relative to said reference surface of said magnetic head assembly so that when said reference surface of said magnetic head assembly is positioned with respect to said reference surface of said arm, said gap will be precisely aligned with the center line of the disc;

and means for attaching the magnetic head assembly means to said arm, whereby said gap is aligned with said center line of said disc.

8. The structure defined by claim 7 wherein a shield substantially surrounds said core and said core has a tip that projects beyond such shield to contact said recording medium at a point removed from said shield.

References Cited

UNITED STATES PATENTS

| | | | |
|---|---|---|---|
| 2,850,582 | 9/1958 | Deraemy | 179—100.2 |
| 2,886,652 | 5/1959 | Davis | 179—100.2 |
| 2,888,522 | 5/1951 | McCutchen | 179—100.2 |
| 2,984,709 | 5/1961 | Rettinger | 179—100.2 |
| 3,000,078 | 9/1961 | Emenaker | 179—100.2 |
| 3,178,519 | 4/1965 | Blumenthal | 179—100.2 |
| 3,185,972 | 5/1965 | Sippel | 340—174.1 |
| 3,303,292 | 2/1967 | Bedell | 179—100.2 |

BERNARD KONICK, *Primary Examiner.*

TERRELL W. FEARS, *Examiner.*

R. SNIDER, A. I. NEUSTADT, *Assistant Examiners.*